July 20, 1937.   W. O. HEBLER   2,087,598
DEVICE FOR TESTING INTERNAL COMBUSTION ENGINES
Filed Dec. 26, 1935
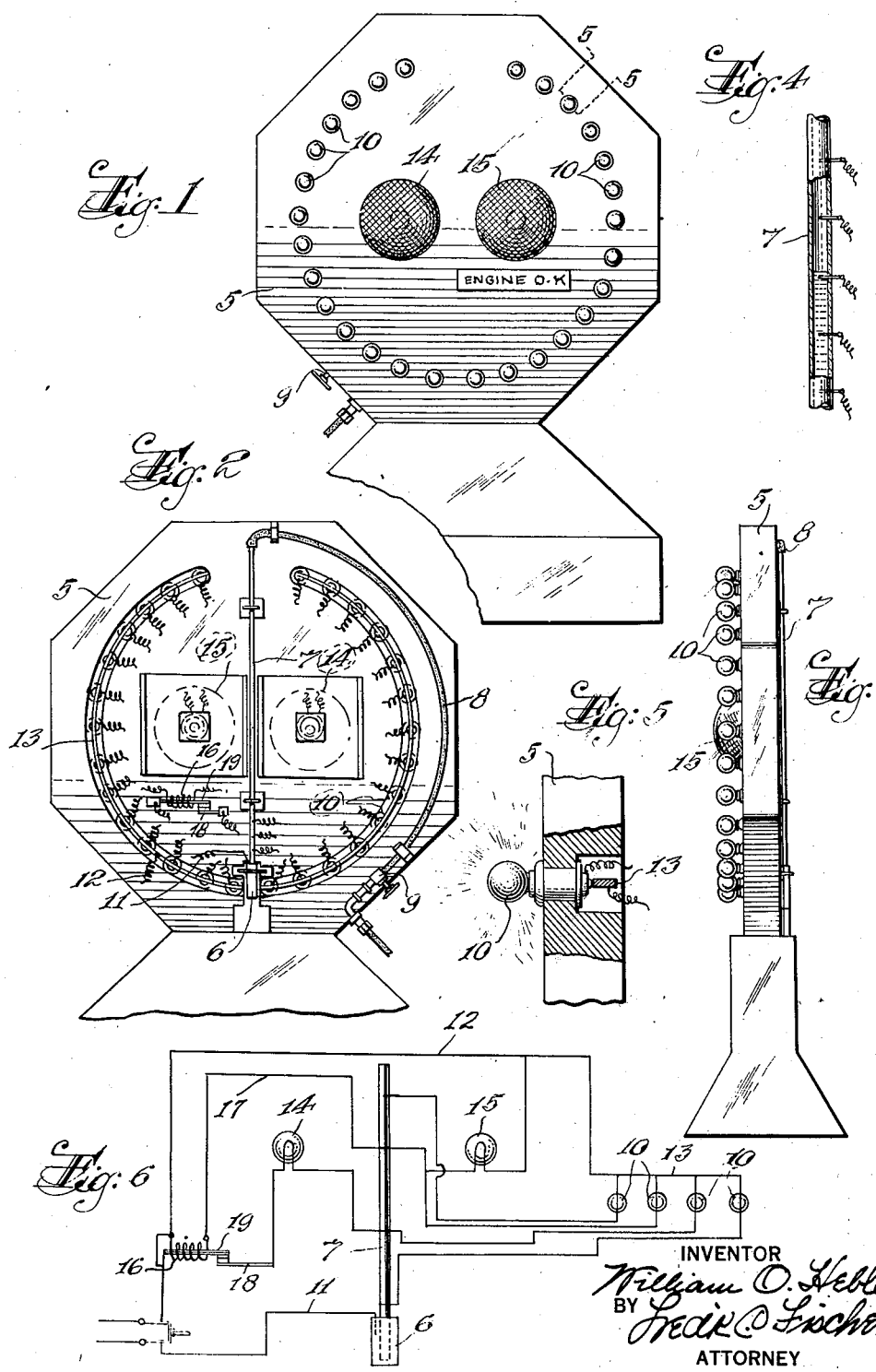

Patented July 20, 1937

2,087,598

UNITED STATES PATENT OFFICE 2,087,598

DEVICE FOR TESTING INTERNAL COMBUSTION ENGINES

William O. Hebler, Westfield, N. J., assignor to Charles Engelhard, Inc., Newark, N. J., a corporation of New Jersey Application December 26, 1935, Serial No. 56,176

2 Claims. (Cl. 177—311)

This invention relates to devices for testing automotive engines and more particularly to means for indicating visually the degree of vacuum of such engines, or wherever the measurement of vacuum is desired.

It is known that the condition of an internal combustion engine such as used on automobiles and the like, can be determined by observing the degree of vacuum present. For instance, on most engines, when the ignition, timing, valves, manifolds, and other essential elements of the engine are in proper working condition, the vacuum produced should be at least 18 inches of mercury. Should the carburetor be not correctly adjusted, the vacuum will probably be lower than 18 inches. If the valves are sticking, the vacuum will fluctuate between 16 and 18 inches. If the timing is late, the vacuum will not reach more than 15 inches of mercury. A mercury column will oscillate violently when any of these conditions are prevalent. Incorrectly synchronized distributors, foul spark plugs, weak valve springs, and many other factors can cause definite pulsations to be made in a column of mercury due to the varying degrees of vacuum pressure.

Heretofore, in the testing of an automotive engine, mercury vacuum gauges have been employed whereby the level of the mercury could be read through a glass tube. Naturally this type of indicator necessitates reading at close range. There has also been used for determining the degree of vacuum, a Bourdon tube, to which is connected a pointer suitably rotated on a gear train. However, this type of gauge is limited from the standpoint of size because the weight of the pointer must be made as light as possible as an excess weight of the pointer would prevent correct indications of slight fluctuations in the vacuum.

It is an object of the present invention to provide a device embodying a mercury vacuum gauge to which is associated means for visually indicating the degree of vacuum in an automotive engine at points remote from the gauge, said visual indicator being in the form of a plurality of incandescent lamps which can be spaced at any desired distance, depending upon the size desired for the indicator.

A further object is the provision of a panel board having mounted thereon a plurality of spaced incandescent lamps which are successively placed in series with a mercury column to indicate visually the degree of vacuum in an automotive engine.

These and other advantageous objects, which will later appear, are accomplished by the simple and practical construction and arrangement of parts hereinafter described and exhibited in the accompanying drawing, forming part hereof, and in which:

Fig. 1 is an elevational view of a panel having arranged thereon a plurality of incandescent lamps adapted to be placed in an electrical circuit containing a column of mercury, Fig. 2 is a rear view of the indicator panel, Fig. 3 is a side elevational view of the indicator panel, Fig. 4 is an enlarged elevational view of a mercury tube used in my invention, parts being broken away, Fig. 5 is an enlarged sectional view taken on line 5—5 of Fig. 1, and Fig. 6 is a wiring diagram embodying my invention.

Referring to the drawing, there is shown a panel 5 having mounted upon the rear side thereof a vessel 6 containing mercury, and extending into the vessel is a tube 7 made of glass, bakelite, or similar materials. The tube 7 is extended vertically along the back of the panel 5 and is connected to an arcuate tube 8 which extends to a point near the lower end of the panel, and is connected to a valve 9 to enable the tube to be connected to preferably, the tube of the windshield wiper or to the intake manifold of an automotive engine. The tube 7 is divided into inches for a distance of about 30 inches. At each interval of one inch on the tube an electrode extends into the tube, the electrode being connected to an incandescent lamp. As will be seen in Figs. 1 and 3 the incandescent lamps 10 are arranged in a circle about the panel; however, they can be arranged in other formations if desired. At each inch of the tube one of the lamps is connected with an electrode extending into the tube. The pool of mercury in the vessel 6 is connected by a wire 11 to one terminal of a source of electric power, the other terminal of the source of electric power being connected by a wire 12 to a common bus bar 13.

From the above description, it will be seen that as the column of mercury rises within the tube 7, there is successively completed an electric circuit through the lamps 10 to cause the lamps to light. For example, when the mercury has risen to seven inches, there will be seven incandescent lamps lighted, and when the mercury rises to twelve inches there will be twelve incandescent lamps lighted, and so on.

While the height of the tube 7 is not variable, it is obvious that the panel 5 can be made any size and the space between the incandescent lamps can be made any length. Also the incandescent lamps can be arranged in any desired manner and need not be arranged in a circle as shown in the drawing.

Preferably, the tube 7 is made of glass or a similar insulating material. However, the tube can be made of metal, in which case electrodes placed at intervals of ¼ inch, of ½ inch, or 1 inch or any multiples thereof, dependent on the capacity of the vacuum measurement desired, must be insulated from the metal tube.

When glass or a similar insulating material is used for the tube, metal electrodes can be suitably mounted and cemented, or fused into the tube.

When the mercury rises to engage an electrode, the circuit is completed through the line 11, mercury in the vessel 6, mercury in the tube 7, through the electrode contacted by the mercury, through the lamp 10, then through the bus-bar 13 and line 12 back to the other terminal of the source of power.

Mounted on the panel on each side of the tube 7 are two lamps 14 and 15 which may be red and green respectively; the red lamp 14 is designed to provide a signal when the condition of the automotive engine is poor and the green lamp 15 indicates when the engine is in proper working condition. For instance, there would be positioned below the green lamp a sign saying "Engine O. K.".

The lamp 14 is connected to an electrode mounted in the tube 7. In parallel with the lamp 14 is a line 17 connected with the resistance 16 and with an electrode mounted in the tube 7, which electrode is in turn connected with the lamp 15, the latter being connected to the line 12.

The lamp 14 is connected to a contact 18 of a thermostatic relay which has an element 19 of thermostatic metal in proximity to the resistance 16. The electrode to which the lamp 14 is connected is preferably inserted in the tube 7 at about 11 inches. The lamp 15 is connected to an electrode in the tube at 18 inches. Consequently when the mercury in the tube 7 rises to eleven inches the red lamp will be lighted and will continue in this condition until the mercury reaches 18 inches, at which point a circuit is closed through the lamp 15 and also through the resistance 16.

After a period of from 10 to 20 seconds the resistance 16 will have created sufficient heat to cause the strip of thermostatic metal 19 to move away from the contact 18 and open the circuit through the lamp 14.

Knowing that internal combustion engines using gasoline as fuel should draw at least 18 inches of vacuum, and, in some instances 19 inches and 20 inches, it will be seen that I have provided a lighting arrangement whereby the lamps are lighted when the mercury makes continuous contact with the electrodes at 18 inches or above in the mercury column for a period of ten to twenty seconds. If the mercury column does not make contact for this length of time with the electrode at 18 inches, the resistance 16 will not have produced sufficient heat to open the circuit to the lamp 14, and there will be a pulsation or flickering of the lamp 15, indicating that something must be wrong with the engine. As stated above, when the mercury remains at the 18 inch electrode for twenty seconds or more, the green lamp 15 will remain lighted and the red lamp 14 will be extinguished and if desired there can be printed beneath the green light an illuminated sign saying, for instance, "Engine O. K.".

From the above description it will be seen that I have provided a device for indicating the condition of an automotive engine by means of incandescent lamps which can be viewed at a considerable distance. Also the flashing of the lights, is a signal to persons who are not skilled in automotive engines, that there is something wrong with the engine. For example, alongside of each light, there can be printed suitable explanations as to what is taking place in the engine when that particular lamp lights. The deducing from gauges as to what is wrong with an internal combustion engine is generally too technical, and is not thoroughly understood by the average attendant at gasoline and oil service stations.

The device herein presented can be installed in gasoline and oil service stations and offered as a free service to customers, and does not require an especially skilled attendant.

The foregoing disclosure is to be regarded as descriptive and illustrative only, and not as restrictive or limitative of the invention, of which many embodiments may be constructed including many modifications, without departing from the general scope herein indicated and denoted in the appended claims.

Having thus described my invention what I claim as new and desire to secure by Letters Patent, is:

1. A device for testing internal combustion engines, comprising a vessel containing a quantity of mercury, a vertically mounted tube extending into said mercury, means for connecting said tube to an intake manifold of an internal combustion engine, a plurality of electrodes mounted in said tube at predetermined intervals, a plurality of incandescent lamps arranged in spaced relation remote from said tube, said lamps being connected to said electrodes, a first signal connected to one of said electrodes, a second signal having different characteristics than the first signal connected to an electrode at a predetermined mark on said tube, a source of electrical current having one terminal thereof connected to the mercury in the vessel and its other terminal connected to said incandescent lamps and signals, and means to open the circuit through the first signal when the mercury rises to the predetermined mark on said tube and remains at said predetermined mark for a predetermined period of time to make a circuit through the second signal, the circuits through the other incandescent lamps not being broken when the mercury rises to said predetermined mark on the tube.

2. A device for testing internal combustion engines, comprising a vessel containing a quantity of mercury, a vertically mounted tube extending into said mercury, means for connecting said tube to an intake manifold of an internal combustion engine, a plurality of electrodes mounted in said tube at predetermined intervals, a plurality of incandescent lamps arranged in spaced relation remote from said tube, said lamps being connected to said electrodes, a first signal connected to one of said electrodes, a second signal having different characteristics than the first signal connected to an electrode at the 18 inch mark of said tube, a source of electrical current having one terminal thereof connected to the mercury in the vessel and its other terminal connected to said incandescent lamps and signals, and means to open the circuit through the first signal when the mercury rises to the 18 inch mark in said tube and remains at said 18 inch mark for a predetermined period of time to make a circuit through the second signal, the circuits through the other incandescent lamps not being broken when the mercury rises to the 18 inch mark on the tube.

WILLIAM O. HEBLER.